(12) United States Patent
Geidl et al.

(10) Patent No.: US 7,760,946 B2
(45) Date of Patent: Jul. 20, 2010

(54) HANDWRITING TEACHING DATA SELECTION SYSTEM

(75) Inventors: Erik M. Geidl, Bellevue, WA (US); James A. Pittman, Issaquah, WA (US)

(73) Assignee: Microsoft Corporation, Redmond, WA (US)

(*) Notice: Subject to any disclaimer, the term of this patent is extended or adjusted under 35 U.S.C. 154(b) by 1036 days.

(21) Appl. No.: 11/454,664

(22) Filed: Jun. 16, 2006

(65) Prior Publication Data

US 2007/0292030 A1 Dec. 20, 2007

(51) Int. Cl.
*G06K 9/00* (2006.01)
(52) U.S. Cl. .............. 382/181; 382/100; 382/155; 382/186; 382/187; 382/190; 706/12; 706/20
(58) Field of Classification Search ............ 382/187; 706/12, 20
See application file for complete search history.

(56) References Cited

OTHER PUBLICATIONS

Marti et al, The IAM-database: an English sentence database for offline handwriting recognition, 2002, Springer-Verlag, IJDAR (2002) 5, 39-46.*
Hochberg et al, Script and Language Identification for Handwritten Document Images, 1999, Springer-Verlag, IJDAR (1999) 2, 45-52-46.*
Palmondon, On-Line and Off-Line Handwriting Recognition: A Comprehensive Survey, Jan. 2000, IEEE, Transactions on Pattern Analysis and Machine Learning, vol. 22. No. 1, 63-84.*
Schomaker, From Handwriting analysis to pen-computer applications, 1998, IEEE, Electronics & Communication Engineering Journal vol. 10 issue 3, 93-102.*
Wienecke et al., Experiments in Unconstrained Offline Handwritten Text Recognition, Aug. 2002, IEEE 8th Int. Workshop on Frontiers in Handwriting Recognition.*
Feng et al., Stroke Data Collection and Dictionary Customization for On-line Handwriting Mathematical Expression, 2001, The 26th National Conference of JSISE.*
Vuurpijil et al., Coarse Writing-Styles Clustering Based on Simple Stroke-Related Features, Sep. 1996, IAPR, Progress in Handwriting Recognition, pp. 29-34.*
Teredesai et al., On-line digit recognition using off-line features, 2002, ICVGIP, vol. 22 No. 14, pp. 1-6.*
Guyon et al. UNIPEN project of on-line data exchange and recognizer benchmarks, 1994, IEEE, In Proceedings of International Conference on Pattern Recognition vol. 2-Conference B, pp. 29-33.*
Viard-Gaudin et al., The IRESTE On/Off (IRONOFF) dual handwriting database, Sep. 1999, IEEE, ICDAR '99. Proceedings of the Fifth International Conference on Document Analysis and Recognition, pp. 455-458.*
Garris, Design and Collection of a Handwriting Sample Image Database, 1992 Social Science Computer Review, pp. 1-24.*

* cited by examiner

*Primary Examiner*—Andrew W Johns
*Assistant Examiner*—Jason Heidemann (57) ABSTRACT

Various technologies and techniques are disclosed that generate a teaching data set for use by a handwriting recognizer. Ink input is received from various ink sources, such as implicit field data, scripted untruthed ink, scripted truth ink, and/or ink from at least one other language in the same script as the target language for the recognizer. The ink input is used with various machine learning methods and/or other algorithmic methods to generate a teaching ink data set. Examples of the various machine learning methods include a character and/or word n-gram distribution leveling method, an allograph method, a subject diversity method, and a print and cursive data selection method. The teaching ink data is used by a handwriting trainer to produce the handwriting recognizer for the target language.

17 Claims, 10 Drawing Sheets

HANDWRITING TEACHING DATA SELECTION SYSTEM

BACKGROUND

Handwriting recognition systems are trained components, meaning that their classification techniques use machine learning algorithms that require a representative "teaching set" of ink samples in order to perform recognitions. A large amount of teaching data must typically be collected in order to generate an accurate recognizer in a particular language. Such data collection can take a large amount of time in order to gather a sufficient quantity of the right type. Furthermore, data collection in one language does not scale to additional languages. In other words, the data collection process must typically be repeated for each language for which to recognize. For one or more of these reasons, the process of creating an accurate handwriting recognizer for one or more languages can be very time consuming and difficult to scale.

SUMMARY

Various technologies and techniques are disclosed that generate a teaching data set for use by a handwriting recognizer. Ink input is received from various ink sources, such as implicit field data, scripted untruthed ink, scripted truthed ink, and/or ink from at least one other language in the same script as the target language for the recognizer. In one implementation, the ink input is unevenly distributed among the sources (e.g. more or less from one source versus another). The ink input is used with various machine learning methods and/or other algorithmic methods to generate a teaching ink data set. A few non-limiting examples of the various machine learning methods that can be used include a character and/or word n-gram distribution leveling method, an allograph method, a subject diversity method, and/or a print and cursive data selection method. The teaching ink data is used by a handwriting trainer to produce the handwriting recognizer for the target language.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

For the purposes of promoting an understanding of the principles of the invention, reference will now be made to the embodiments illustrated in the drawings and specific language will be used to describe the same. It will nevertheless be understood that no limitation of the scope is thereby intended. Any alterations and further modifications in the described embodiments, and any further applications of the principles as described herein are contemplated as would normally occur to one skilled in the art.

The system may be described in the general context as an application that generates a teaching data set for use by a handwriting recognizer, but the system also serves other purposes in addition to these. In one implementation, one or more of the techniques described herein can be implemented as features within a handwriting recognition program, or from any other type of program or service that produces training sets for use in handwriting recognition programs.

Figure 1:
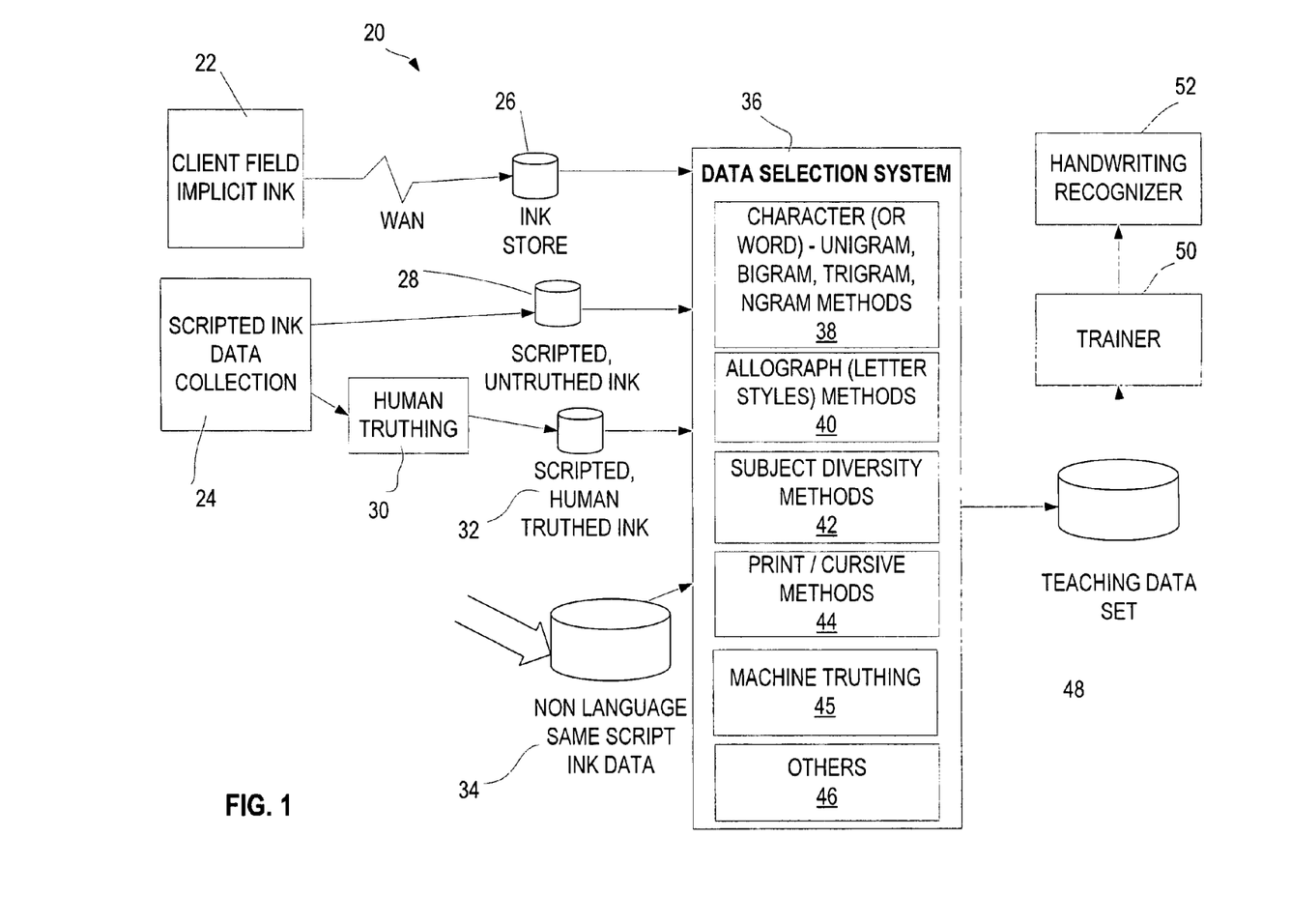
FIG. 1 is a diagrammatic view of a system of one implementation.

As shown in FIG. 1, an exemplary system 20 for producing a training data set for a handwriting recognizer is shown. Ink input is received from a variety of input sources, such as client field implicit ink 22 and scripted ink data collection 24. A non-limiting example of scripted ink data collection 24 includes paid on-site collection centers with paid and/or unpaid ink donors. A non-limiting example of client field implicit ink includes ink received over a WAN or other network, such as from users who participate in a live ink collection process during their normal use. In one implementation, client field implicit ink 22 is stored in ink store 26. A few non-limiting examples of scripted ink data collection includes scripted, untruthed (e.g. unvalidated) ink 28, and scripted, human truthed ink 32 that has been truthed (e.g. validated) by a human reviewer through a human truthing process 30. In one implementation, the scripted ink data collection is gathered during normal field data collection processes.

Non-language, same script ink data 34 (e.g. ink data of a different language, but of the same script as the target language) is also used as one of the ink inputs. A non-limiting example of what constitutes a "same script" includes languages that have an overlapping set of Unicode points or other points. For example, various languages based on the Latin script may be considered to be of the same script, and/or various languages based on the Cryllic script may be considered to be of the same script. While FIG. 1 illustrates storing the various ink inputs in different data stores (26, 28, 32, and 34, respectively), it will be appreciated that the various inputs can be stored in a single data store or in other variations for use by and/or input to data selection system 36.

The various ink inputs (26, 28, 32, and 34) are provided to and/or retrieved by data selection system 36. Data selection system 36 performs various machine learning methods and/or other algorithmic methods against the ink input to produce a teaching data set 48 that is provided to the trainer 50 for use in handwriting recognition by the handwriting recognizer 52. A few non-limiting examples of the machine learning methods and/or other algorithmic methods that can be used to produce the teaching data set 48 include character (or word) n-gram methods 38, allograph (letter styles) methods 40, subject diversity methods 42, print/cursive data selection methods 44, machine truthing 45, and/or other data selection methods 46. Some or all of the features of system 20 will be described in further detail in FIGS. 2-10.

Figure 2:
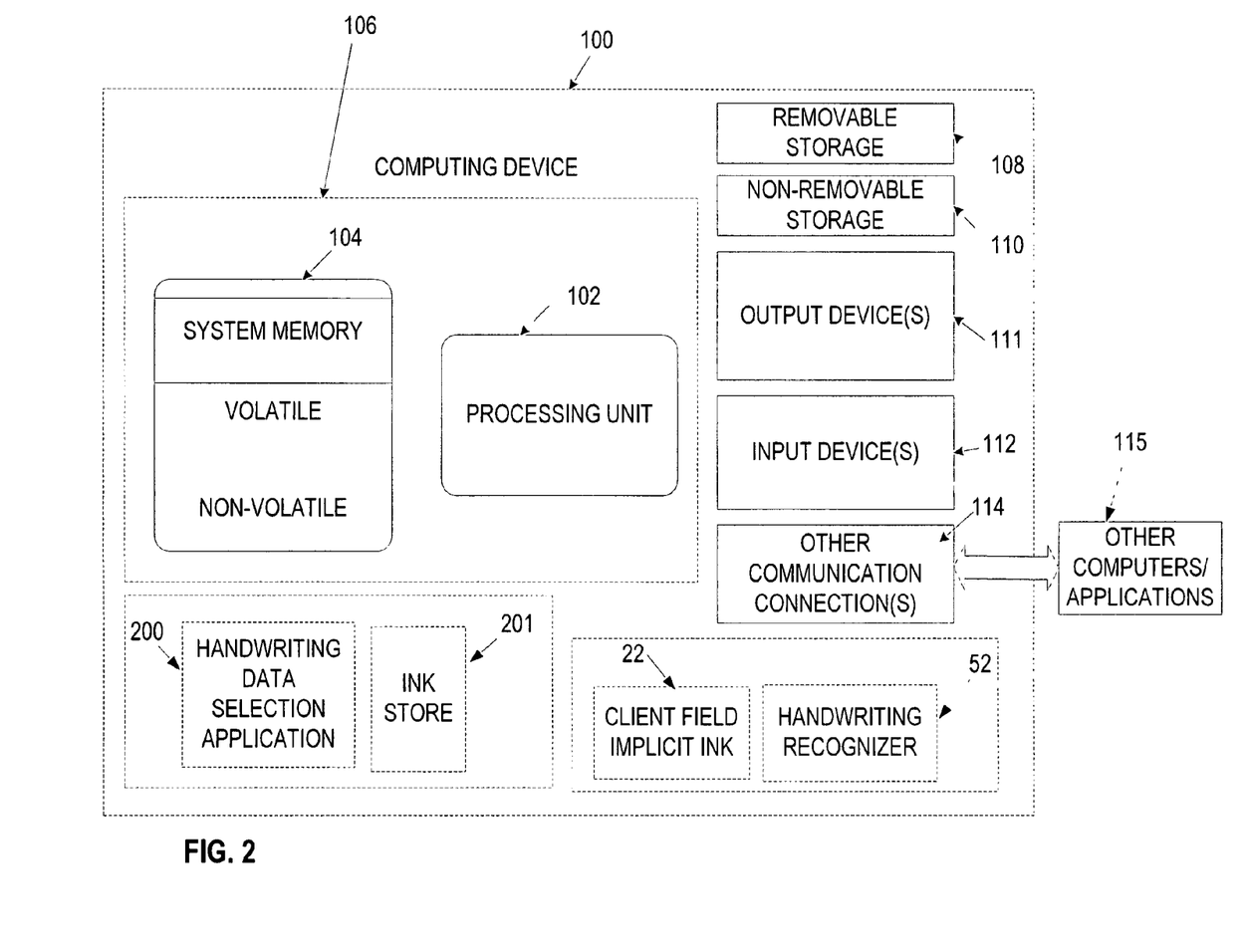
FIG. 2 is a diagrammatic view of a computer system of one implementation of the system of FIG. 1.

As shown in FIG. 2, an exemplary computer system to use for implementing one or more parts of the system includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 2 by dashed line 106.

Additionally, device 100 may also have additional features/ functionality. For example, device 100 may also include additional storage (removable and/or non-removable) including, but not limited to, magnetic or optical disks or tape. Such additional storage is illustrated in FIG. 2 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Computing device 100 includes one or more communication connections 114 that allow computing device 100 to communicate with other computers/applications 115. Device 100 may also have input device(s) 112 such as keyboard, mouse, pen, voice input device, touch input device, etc. Output device(s) 111 such as a display, speakers, printer, etc. may also be included. These devices are well known in the art and need not be discussed at length here.

In one implementation, computing device 100 includes handwriting data selection application 200, which performs some or all of the features of data selection system 36 on FIG. 1, and/or contains ink store 201, which contains ink stores 26, 28, 32, and/or 34. One implementation in which handwriting data selection application 200 and/or ink store 201 are present on computing device 100 is when computing device 100 is used with data selection system 36 by a developer for developing handwriting recognizer 52. Alternatively or additionally to handwriting data selection application 200 and/or ink store 201, client implicit field ink 22 and/or handwriting recognizer 52 may be included on computing device 100. One implementation in which client implicit field ink 22 and/or handwriting recognizer 52 are present on computing device 100 is when the machine is used by a customer or client computing device (such as after the handwriting recognizer 52 has been developed by the developer using handwriting data selection application 200 on a separate computing device 100). Handwriting data selection application 200, ink store 201, client implicit field ink 22, and/or handwriting recognizer 52 are shown on FIG. 2 with dotted lines since one, all, none, or a combination of them may be present on a given computing device 100 depending on the purpose of the device. Handwriting data selection application 200 will now be described in further detail in FIG. 3.

Figure 3:
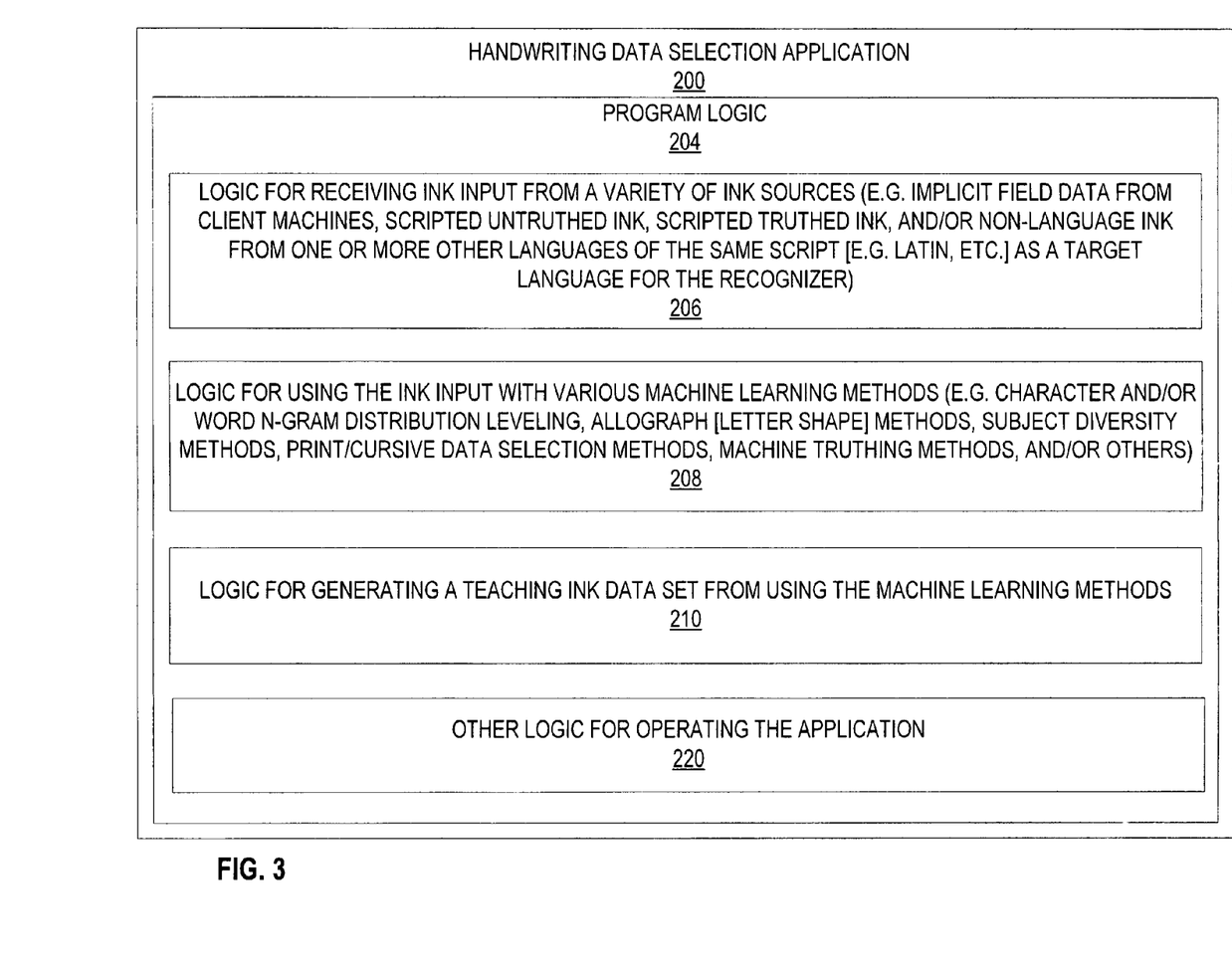
FIG. 3 is a diagrammatic view of a handwriting data selection application of one implementation operating on the computer system of FIG. 1.

Turning now to FIG. 3 with continued reference to FIGS. 1 and 2, a handwriting data selection application 200 operating on computing device 100 is illustrated. Handwriting data selection application 200 is one of the application programs that reside on computing device 100. However, it will be understood that handwriting data selection application 200 can alternatively or additionally be embodied as computer-executable instructions on one or more computers and/or in different variations than shown on FIG. 2. Alternatively or additionally, one or more parts of handwriting data selection application 200 can be part of system memory 104, on other computers and/or applications 115, or other such variations as would occur to one in the computer software art.

Handwriting data selection application 200 includes program logic 204, which is responsible for carrying out some or all of the techniques described herein. Program logic 204 includes logic for receiving ink input from a variety of ink sources (e.g. implicit field data from client machines, scripted untruthed ink, scripted truthed ink, and/or non-language ink from one or more other languages of the same script [e.g. Latin, etc.] as a target language for the recognizer) 206; logic for using the ink input with various machine learning methods (e.g. character and/or word n-gram distribution leveling, allograph [letter shape] methods, subject diversity methods, print/cursive data selection methods, machine truthing methods (e.g. similarity/dissimilarity measures, multiple voting experts, etc.), and/or others) and/or other algorithmic methods 208; logic for generating a teaching ink data set from using the machine learning methods and/or other algorithmic methods 210; and other logic for operating the application 220. In one implementation, program logic 204 is operable to be called programmatically from another program, such as using a single call to a procedure in program logic 204.

Figure 4:
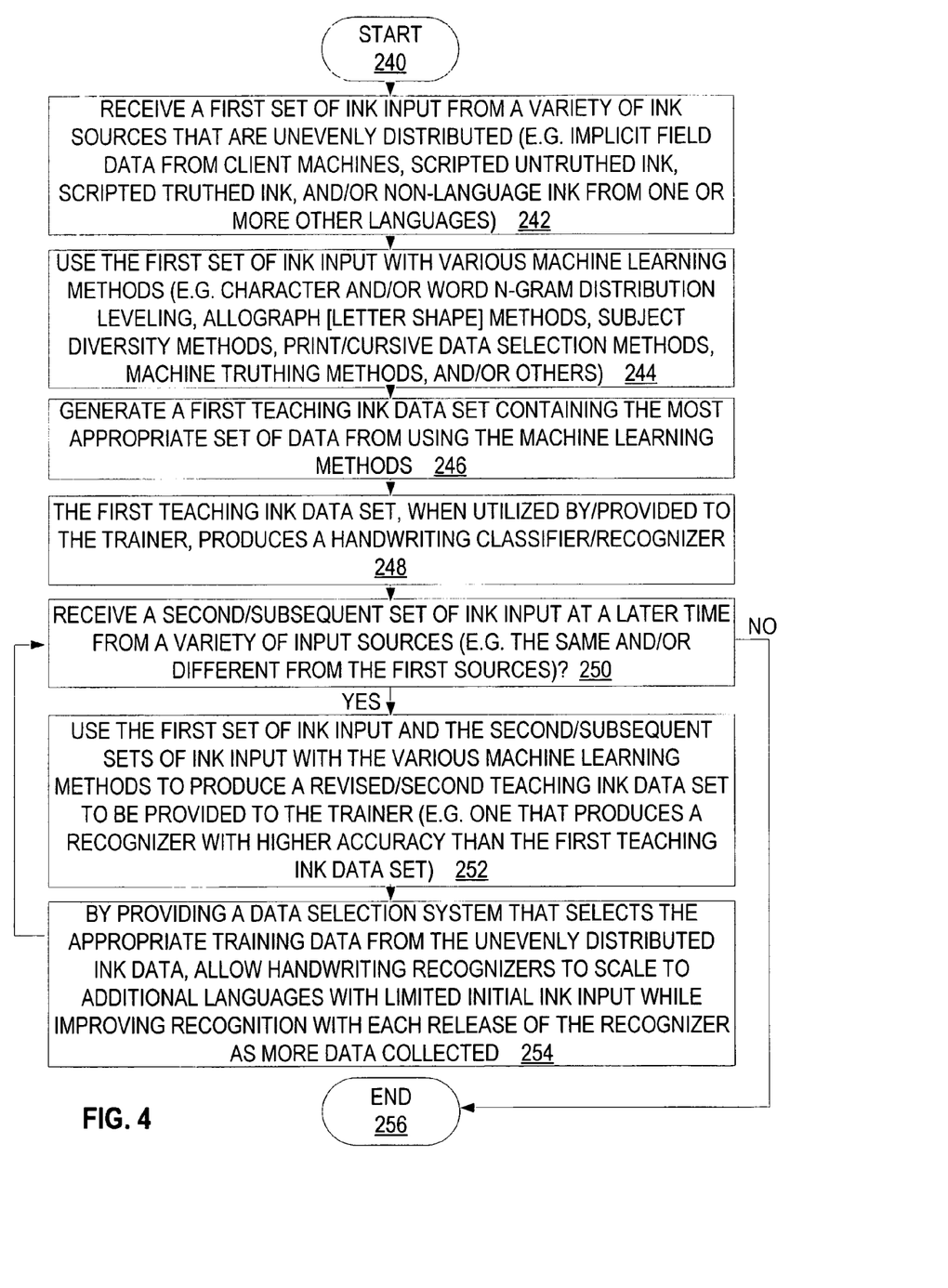
FIG. 4 is a process flow diagram for one implementation of the system of FIG. 1 illustrating the stages involved in providing a data selection system for generating a teaching ink data set.

Turning now to FIGS. 4-10 with continued reference to FIGS. 1-3, the stages for implementing one or more implementations of handwriting data selection application 200 are described in further detail. FIG. 4 illustrates one implementation of the stages involved in providing a data selection system for generating a teaching ink data set. In one form, the process of FIG. 4 is at least partially implemented in the operating logic of computing device 100. The procedure begins at start point 240 with receiving a first set of ink input from a variety of ink sources that are unevenly distributed (e.g. implicit field data from client machines, scripted untruthed ink, scripted truthed ink, and/or non-language ink from one or more other languages) (stage 242). The first set of ink input is used with various machine learning methods (e.g. character and/or word n-gram distribution leveling, allograph [letter shape] methods, subject diversity methods, print/cursive data selection methods, machine truthing methods [e.g. similarity/dissimilarity measures, multiple voting experts, etc. to automatically truth the ink], and/or others) (stage 244). A first teaching ink data set containing the most appropriate set of data is generated from using the machine learning algorithms (stage 246). The first teaching ink data set, when utilized by/provided to the trainer, produces a handwriting recognizer (stage 248).

A second/subsequent set of ink input is optionally received at a later time from a variety of input sources (e.g. the same and/or different from the first ink sources) (decision point 250). If and when the second/subsequent set of ink input is received (decision point 250), the first set of ink input and the second/subsequent set of ink input are used with the various machine learning methods and/or other algorithmic methods to produce a revised/subsequent teaching ink data set to be provided to the trainer (e.g one that produces a recognizer with higher accuracy than the first teaching ink data set) (stage 252). By providing a data selection system that selects the appropriate training data from the unevenly distributed ink data, the system allows handwriting recognizers to scale to additional languages with limited initial ink input while improving recognition with each release of the recognizer as more data collected (stage 254). The process loops back to stage 250, since later iterations of the teaching ink data set can be produced over time. If no additional ink input is ever received however (decision point 250), then the process ends at end point 256.

Figure 5:
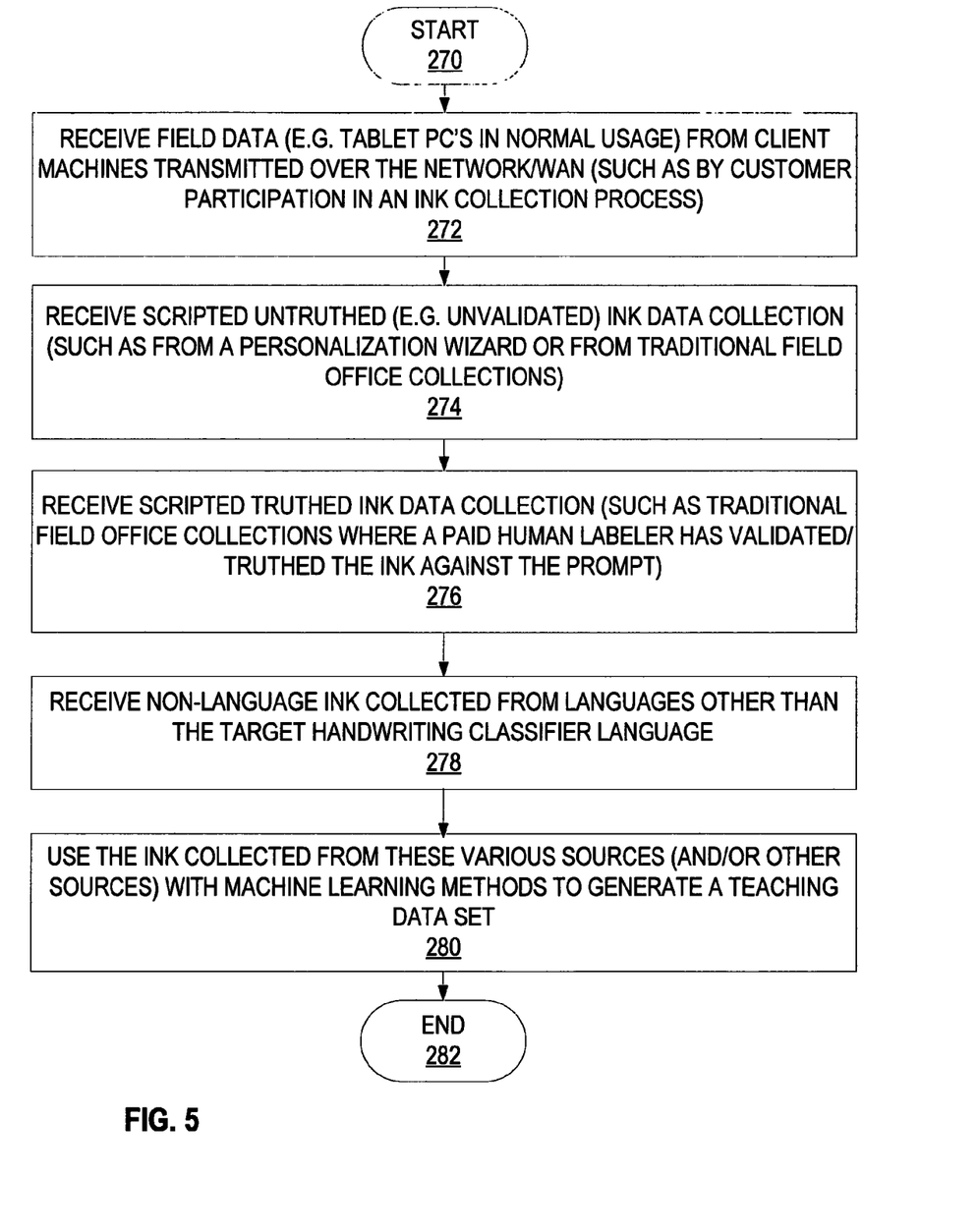
FIG. 5 is a process flow diagram for one implementation of the system of FIG. 1 illustrating the stages involved in receiving ink input from a variety of ink sources.

FIG. 5 illustrates one implementation of the stages involved in receiving ink input from a variety of ink sources. In one form, the process of FIG. 5 is at least partially implemented in the operating logic of computing device 100. The procedure begins at start point 270 with receiving field data (e.g. from tablet pc's in normal usage) from client machines transmitted over the WAN or other network (such as by customer participation in an ink collection process) (stage 272). Scripted untruthed (e.g. unvalidated) ink data collection is received (such as from a personalization wizard or from traditional field office collections) (stage 274). Scripted truthed ink data collection is received (such as traditional field office collections where a paid human labeler has truthed the ink against the prompt) (stage 276). Non-language ink collected from languages other than the target handwriting recognizer language are received (stage 278). The ink collected from these various sources (and/or other sources) is used with machine learning algorithms to generate a teaching data set (stage 280). The process ends at end point 282.

Figure 6:
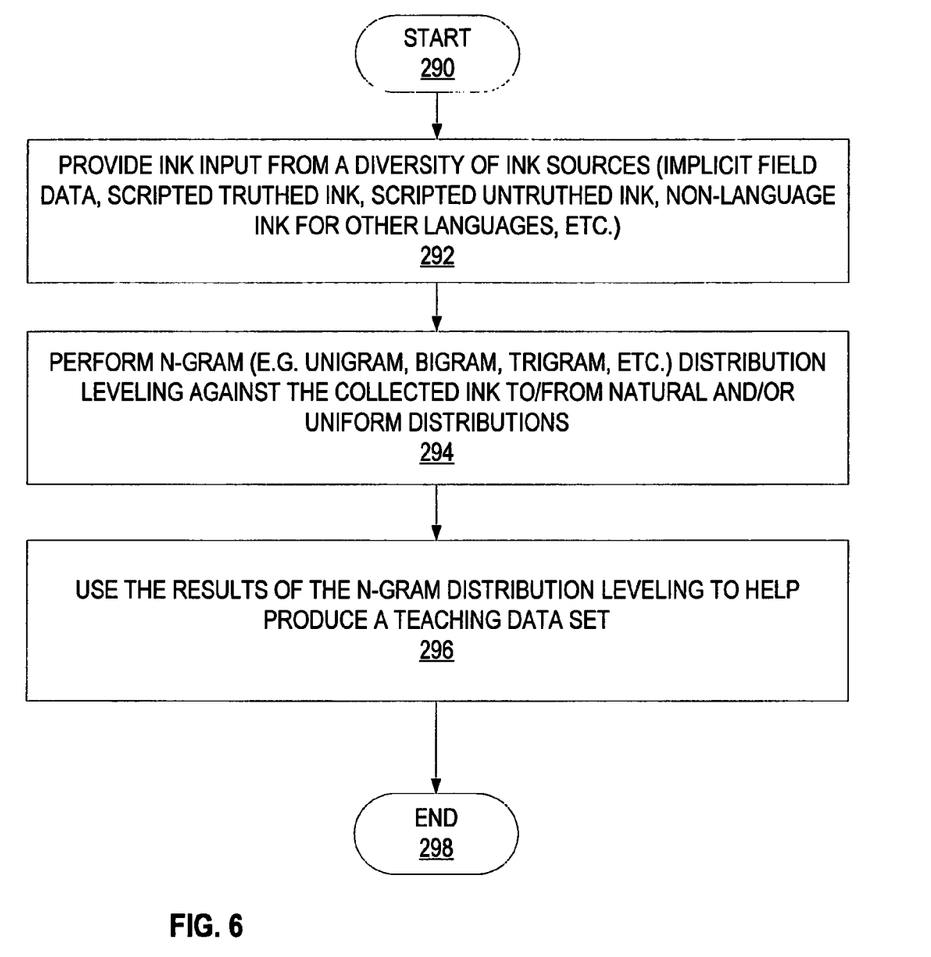
FIG. 6 is a process flow diagram for one implementation of the system of FIG. 1 illustrating the stages involved in using character and/or word n-gram distribution leveling against the ink from the diverse sources.

FIG. 6 illustrates one implementation of the stages involved in using character and/or word n-gram distribution leveling against the ink from the diverse sources. In one form, the process of FIG. 6 is at least partially implemented in the operating logic of computing device 100. The procedure begins at start point 290 with providing ink input from a diversity of ink sources (implicit field data, scripted truthed ink, scripted untruthed ink, non-language ink for other languages, etc.) (stage 292). N-gram (e.g. unigram, bigram, trigram, etc.) distribution leveling is performed against the collected ink to/from natural and/or uniform distributions (stage 294). In one implementation, natural distribution is the frequency of a character (or word) in typical world usage for the language. For example, in English, the letter "N" has a much higher natural frequency than the letter "Z". In one implementation, uniform distribution is a flat distribution, where all characters (or words) are assigned equal frequency. In one implementation, n-gram distribution leveling can be applied to characters and/or words. The results of the n-gram distribution leveling are used to help produce a teaching data set (stage 296). In one implementation, n-gram distribution techniques can be coupled with allograph analysis to further enhance the results. The process ends at end point 298.

Figure 7:
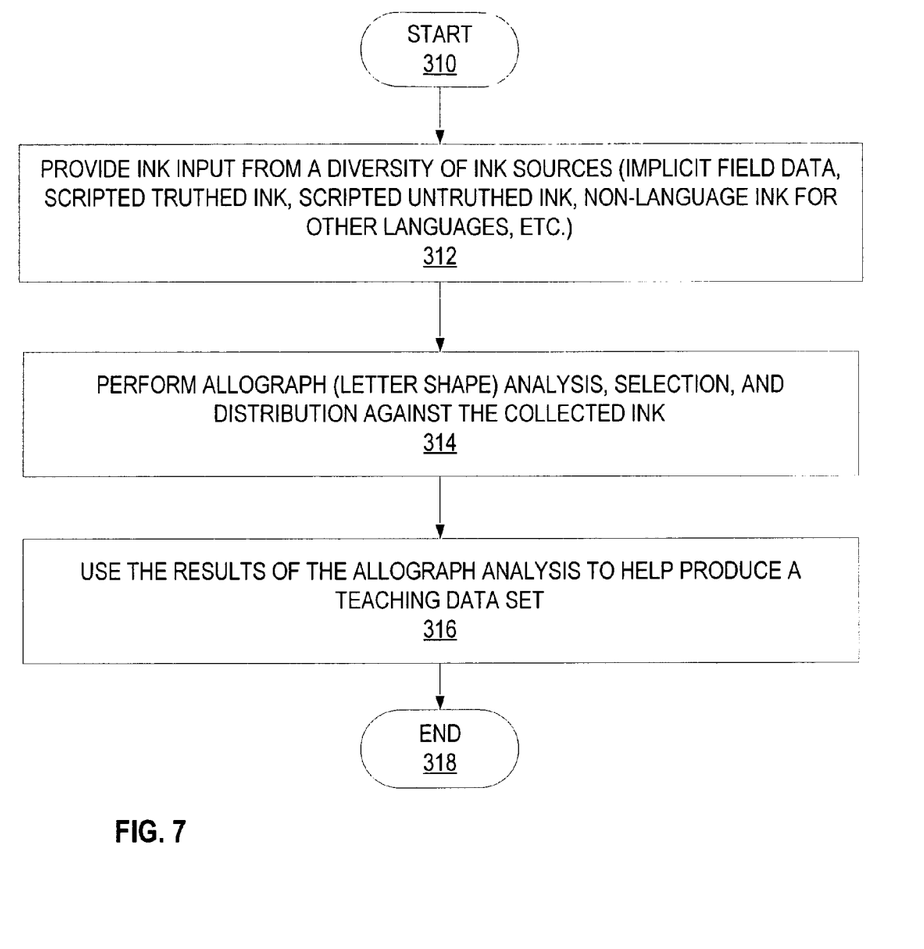
FIG. 7 is a process flow diagram for one implementation of the system of FIG. 1 that illustrates the stages involved in using allograph (letter shape) analysis, selection, and distribution modification against the ink from the diverse sources.

FIG. 7 illustrates one implementation of the stages involved in using allograph (letter shape) analysis, selection, and distribution modification against the ink from the diverse sources. In one form, the process of FIG. 7 is at least partially implemented in the operating logic of computing device 100.

The procedure begins at start point 310 with providing ink input from a diversity of ink sources (implicit field data, scripted truthed ink, scripted untruthed ink, non-language ink for other languages, etc.) (stage 312). Allograph (letter shape) analysis, selection, and distribution is performed against the collected ink (stage 314). As a few non-limiting examples, this can include using self-organizing shape clusters, using density-based modeling, and/or optimizing the distribution of rare character forms (allographs) and common character forms for an improved out-of-box customer experience. The results of the allograph analysis are used to help produce a teaching data set (stage 316). The process ends at end point 318.

Figure 8:
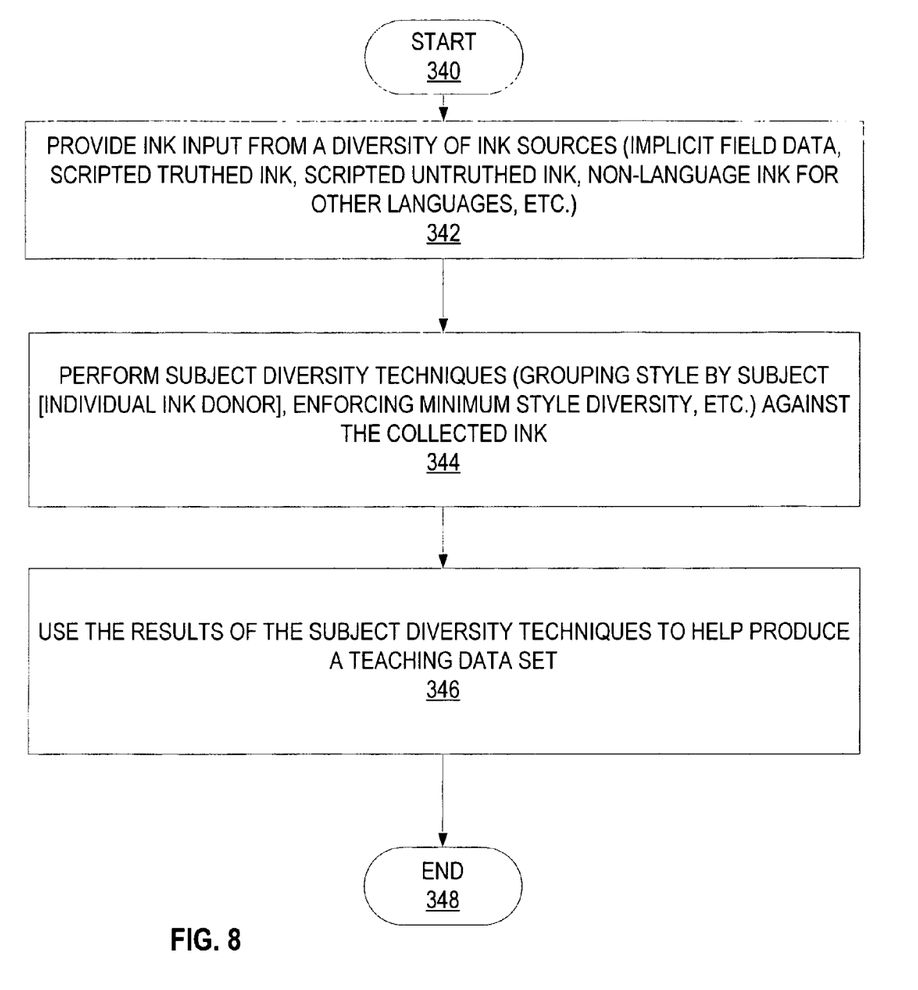
FIG. 8 is a process flow diagram for one implementation of the system of FIG. 1 that illustrates the stages involved in using subject diversity methods against the ink from the diverse sources.

FIG. 8 illustrates one implementation of the stages involved in using subject diversity techniques against the ink from the diverse sources. In one implementation, a subject is defined as an individual donor of ink samples. In one form, the process of FIG. 8 is at least partially implemented in the operating logic of computing device 100. The procedure begins at start point 340 with providing ink input from a diversity of ink sources (implicit field data, scripted truthed ink, scripted untruthed ink, non-language ink for other languages, etc.) (stage 342). Subject diversity methods (grouping style by subject [individual ink donor], enforcing minimum style diversity, etc.) are performed against the collected ink (stage 344). The results of the subject diversity methods are used to help produce a teaching data set (stage 346). The process ends at end point 348.

Figure 9:
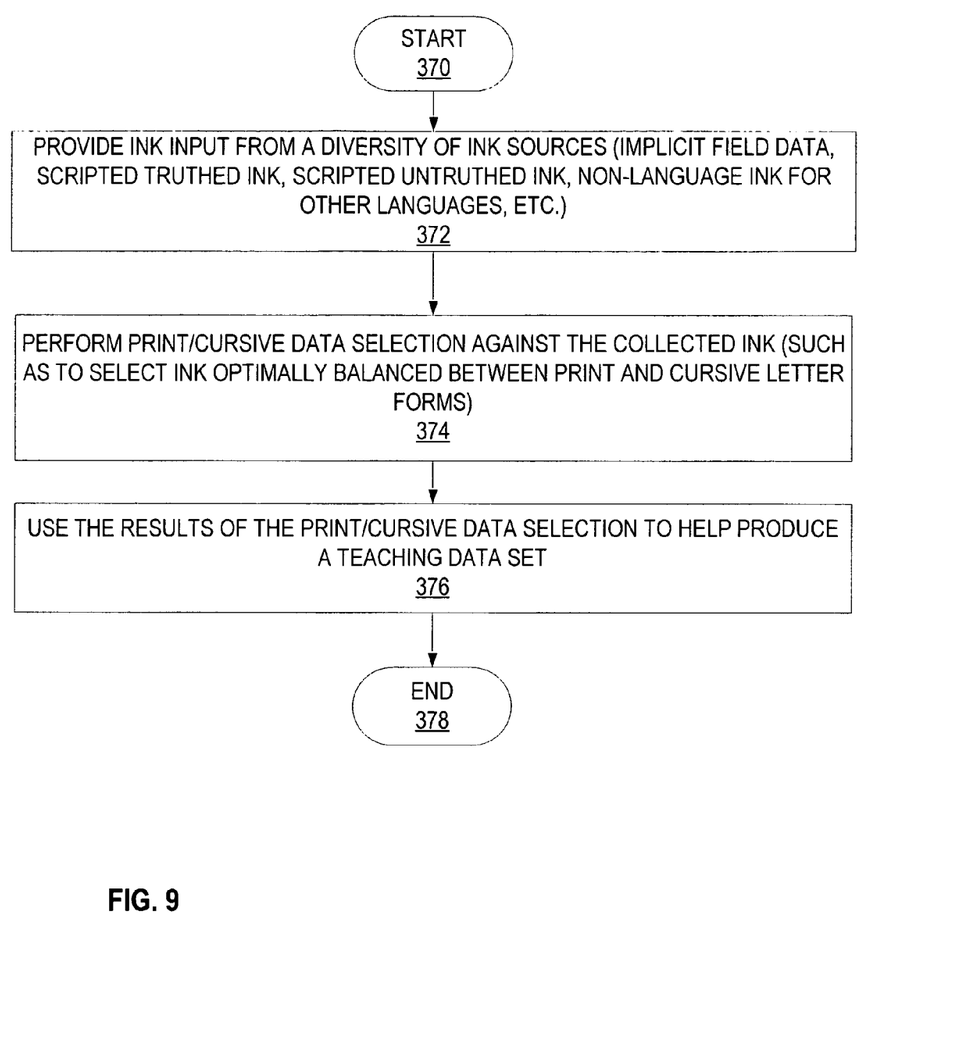
FIG. 9 is a process flow diagram for one implementation of the system of FIG. 1 that illustrates the stages involved in using print/cursive data selection methods against the ink from the diverse sources.

FIG. 9 illustrates one implementation of the stages involved in using print/cursive data selection algorithms against the ink from the diverse sources. In one form, the process of FIG. 9 is at least partially implemented in the operating logic of computing device 100. The procedure begins at start point 370 with providing ink input from a diversity of ink sources (implicit field data, scripted truthed ink, scripted untruthed ink, non-language ink for other languages, etc.) (stage 372). Print/cursive data selection is performed against the collected ink (such as to select ink optimally balanced between print and cursive letter forms) (stage 374). The results of the print/cursive data selection are used to help produce a teaching data set (stage 376). The process ends at end point 378.

Figure 10:
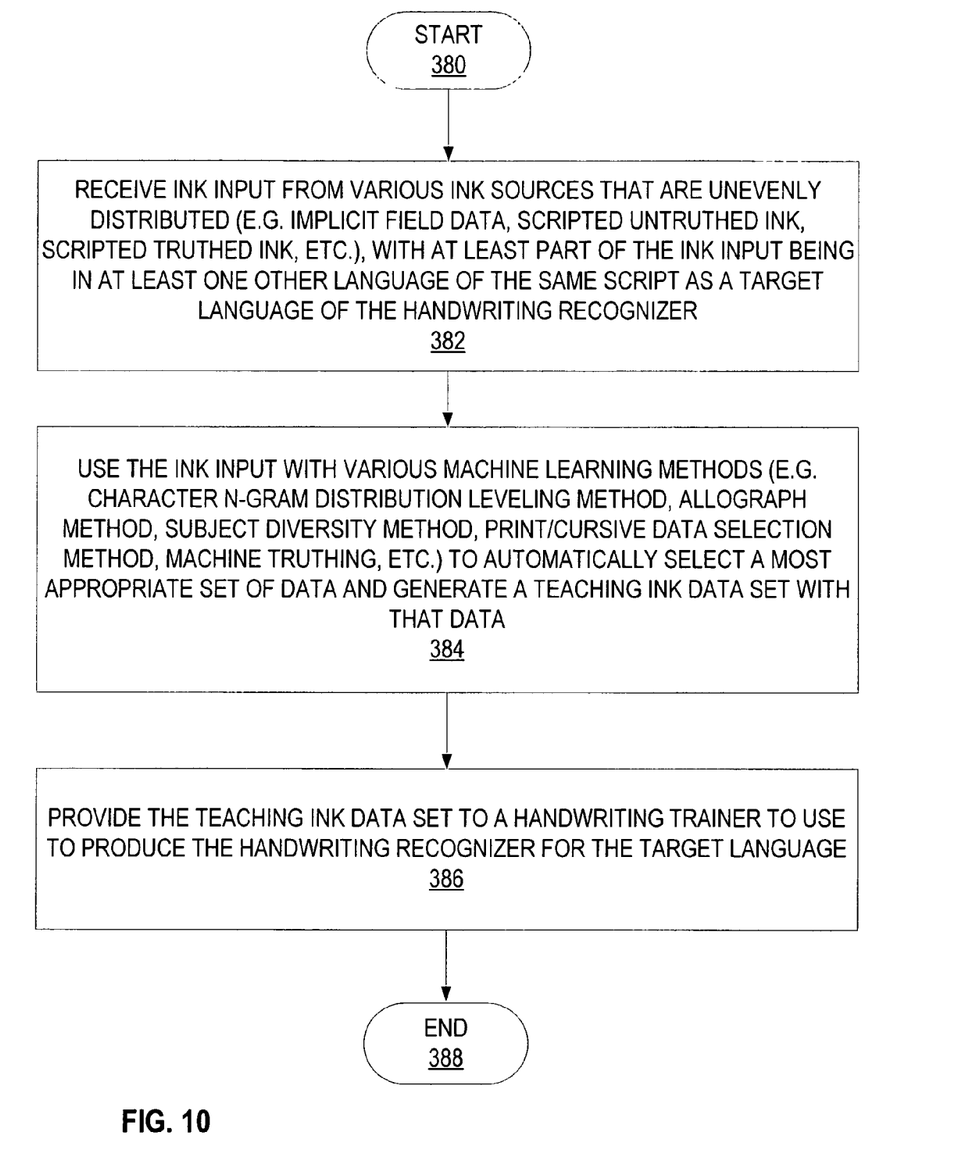
FIG. 10 is a process flow diagram for one implementation of the system of FIG. 1 that illustrates the stages involved in using ink from multiple languages to produce a teaching data set.

FIG. 10 is a process flow diagram for one implementation of the system of FIG. 1 that illustrates the stages involved in using ink from multiple languages to produce a teaching data set. In one form, the process of FIG. 10 is at least partially implemented in the operating logic of computing device 100. The procedure begins at start point 380 with receiving ink input from various ink sources that are unevenly distributed (e.g. implicit field data, scripted untruthed ink, scripted truthed ink, etc.) (stage 382). In one implementation, at least part of the ink input is in at least one other language of the same script as the target language of the handwriting recognizer (stage 382). The ink input is used with various machine learning methods (e.g. character and/or word n-gram distribution leveling method, allograph method, subject diversity method, print/cursive data selection method, machine truthing method, etc.) and/or other algorithmic methods to automatically select a most appropriate set of data and generate a teaching ink data set with that data (stage 384). The teaching ink data set is provided to a handwriting trainer to use to produce the handwriting recognizer for the target language (stage 386). The process ends at end point 388.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the client and/or server arrangements, user interface screen content, and/or data layouts as described in the examples discussed herein could be organized differently on one or more computers to include fewer or additional options or features than as portrayed in the examples.

What is claimed is:

1. A method for generating a teaching ink data set comprising:
   receiving a first set of ink input from a plurality of ink sources, at least two of the ink sources being selected from the group consisting of implicit field data, scripted untruthed ink, scripted truthed ink, and ink from at least one other language of a same script as a target language for a recognizer;
   generating a first teaching ink data set based upon executing a first plurality of machine learning methods upon the first set of ink input;
   receiving a second set of ink input from a plurality of ink sources, at least two of the ink sources being selected from the group consisting of implicit field data, scripted untruthed ink, scripted truthed ink, and ink from at least one other language of a same script as a target language for a recognizer; and
   generating a second teaching ink data set based upon executing a second plurality of machine learning methods upon the second set of ink input in light of the first teaching ink data set, the first plurality of machine learning methods comprising machine learning methods different from machine learning methods of the second plurality of machine learning methods.

2. The method of claim 1, the first plurality of machine learning methods comprising:
   two or more machine learning methods selected from the group consisting of a character n-gram distribution leveling method, an allograph method, a subject diversity method, a machine truthing method, and a print and cursive data selection method based upon the first set of ink input.

3. The method of claim 2, the second plurality of machine learning methods comprising:
   two or more machine learning methods selected from the group consisting of a character n-gram distribution leveling method, an allograph method, a subject diversity method, a machine truthing method, and a print and cursive data selection method based upon the second set of ink input and the first teaching ink data set.

4. The method of claim 2, wherein the allograph method analyzes a plurality of letter shapes in the first set of ink input to determine a predetermined selection.

5. The method of claim 2, wherein the subject diversity method obtains a desired number of diverse writing styles within the first teaching ink data set.

6. The method of claim 2, wherein the print and cursive data selection method analyzes the first set of ink input to select a subset of the first ink input that matches a style appearing at a higher frequency in the target language than in a non-target language.

7. The method of claim 1, comprising using the second teaching ink data set by a handwriting trainer to produce the handwriting recognizer for the target language.

8. The method of claim 1, the second plurality of machine learning methods automatically selecting a subset of the second set of ink input to generate the second teaching ink data set.

9. The method of claim 1, wherein the implicit field data is collected from a plurality of client machines during normal usage and transmitted over a network.

10. The method of claim 1, wherein the scripted truthed ink is collected from traditional field office collections and then validated by a human.

11. A method for generating a teaching ink data set comprising:
    receiving a first set of ink input from a plurality of ink sources, at least one of the ink sources being selected from the group consisting of implicit field data, scripted untruthed ink, scripted truthed ink, and ink from at least one other language of a same script as a target language for a recognizer;
    generating a first teaching ink data set based upon executing a first plurality of machine learning methods selected from the group consisting of a character n-gram distribution leveling method, an allograph method, a subject diversity method, a machine truthing method, and a print and cursive data selection method upon the first set of ink input;
    receiving a second set of ink input from a plurality of ink sources, at least one of the ink sources being selected from the group consisting of implicit field data, scripted untruthed ink, scripted truthed ink, and ink from at least one other language of a same script as a target language for a recognizer; and
    generating a second teaching ink data set based upon executing a second plurality of machine learning methods upon the second set of ink input in light of the first teaching ink data set, the first plurality of machine learning methods comprising machine learning methods different from machine learning methods of the second plurality of machine learning methods.

12. The method of claim 11, the plurality of ink sources comprising two or more ink sources selected from the group consisting of implicit field data, scripted untruthed ink, scripted truthed ink, and nonlanguage same script ink data.

13. The method of claim 12, wherein the implicit field data is collected from a plurality of client machines during normal usage and transmitted over a network.

14. The method of claim 12, wherein the scripted truthed ink is collected from traditional field office collections and then validated by a human.

15. The method of claim 11, comprising:
    using the second teaching ink data set by a handwriting trainer to produce a handwriting recognizer for a target language.

16. The method of claim 11, the first plurality of machine learning methods automatically selecting the second set of ink input.

17. A computer-readable medium having computer-executable instructions for causing a computer to perform acts comprising:
    receiving a first set of ink input from a plurality of ink sources, at least one of the ink sources being selected from the group consisting of implicit field data, scripted untruthed ink, scripted truthed ink, and ink from at least one other language of a same script as a target language for a recognizer;

generating a first teaching ink data set based upon executing a first plurality of machine learning methods upon the first set of ink input;

receiving a second set of ink input from a plurality of ink sources, at least one of the ink sources being selected from the group consisting of implicit field data, scripted untruthed ink, scripted truthed ink, and ink from at least one other language of a same script as a target language for a recognizer; and generating a second teaching ink data set based upon executing a second plurality of machine learning methods upon the second set of ink input in light of the first teaching ink data set, the first plurality of machine learning methods comprising machine learning methods different from machine learning methods of the second plurality of machine learning methods.

* * * * *